United States Patent
Leong et al.

(10) Patent No.: US 8,232,790 B2
(45) Date of Patent: Jul. 31, 2012

(54) ARCHITECTURE FOR CONTROLLING A DUAL POLARITY, SINGLE INDUCTOR BOOST REGULATOR USED AS A DUAL POLARITY SUPPLY IN A HARD DISK DRIVE DUAL STAGE ACTUATOR (DSA) DEVICE

(75) Inventors: Kong Yin Leong, Singapore (SG); Soon Hwei Tan, Singapore (SG)

(73) Assignee: STMicroelectronics Asia Pacific Pte Ltd., Singapore (SG)

( * ) Notice: Subject to any disclaimer, the term of this patent is extended or adjusted under 35 U.S.C. 154(b) by 316 days.

(21) Appl. No.: 12/580,157

(22) Filed: Oct. 15, 2009

(65) Prior Publication Data

US 2011/0089920 A1 Apr. 21, 2011

(51) Int. Cl.
*G05F 1/40* (2006.01)
(52) U.S. Cl. .................. 323/285; 323/267
(58) Field of Classification Search ............ 323/222, 323/224, 267, 271–273, 282–288, 259, 350; 363/16, 17, 34, 39, 56.01, 97, 98, 132, 131, 363/134
See application file for complete search history.

(56) References Cited

U.S. PATENT DOCUMENTS

| | | | | |
|---|---|---|---|---|
| 4,958,121 A | * | 9/1990 | Cuomo et al. | 323/224 |
| 4,967,138 A | * | 10/1990 | Obergfell et al. | 323/224 |
| 5,717,562 A | * | 2/1998 | Antone et al. | 361/155 |
| 5,969,964 A | * | 10/1999 | Mangtani | 363/132 |
| 6,222,351 B1 | | 4/2001 | Fontanella et al. | |
| 7,250,746 B2 | * | 7/2007 | Oswald et al. | 323/284 |
| 7,276,886 B2 | * | 10/2007 | Kinder et al. | 323/267 |
| 7,733,070 B2 | * | 6/2010 | Kumagai | 323/267 |
| 7,928,713 B2 | * | 4/2011 | Nguyen | 323/282 |

OTHER PUBLICATIONS

STMicroelectronics, Inc., L6660 Data Sheet for Milli-Actuator Driver, Dec. 2000, pp. 1-9.
STMicroelectronics, Inc., L6270, L6271 Data Sheet for Milli-Actuator Driver, Feb. 1999, pp. 1-10.
Texas Instruments, TPS65120, TPS65121, TPS65123, TPS65124, Data Sheet for Single-Inductor Quadruple-Output TFT LCD Power Supply, SLVS531, Jun. 2004, pp. 1-23.

* cited by examiner

*Primary Examiner* — Rajnikant Patel
(74) *Attorney, Agent, or Firm* — Hogan Lovells US LLP

(57) ABSTRACT

A dual supply circuit uses a dual feedback control, single inductor, dual polarity boost architecture with a low side power FET for end of current recirculation sensing. A dual feedback system tracks the output voltage variations and a low side power FET end of current recirculation sensing utilizes the internal current limit sensing system. Logic defining the state of operations allows the regulator to operate in both single and dual mode to cater to wide application ranges. The positive boost regulator can be operated in a buck mode making the output voltage constant with high input supply.

20 Claims, 19 Drawing Sheets

ARCHITECTURE FOR CONTROLLING A DUAL POLARITY, SINGLE INDUCTOR BOOST REGULATOR USED AS A DUAL POLARITY SUPPLY IN A HARD DISK DRIVE DUAL STAGE ACTUATOR (DSA) DEVICE

BACKGROUND OF THE INVENTION

1. Field of Invention

The present invention is related to any application using a DC/DC converter, especially when a dual polarity boost regulator is needed in a hard disk DSA. Costs related to silicon area and precision are the main concerns in integrated circuit design industry. Accordingly, there is a continuing need to supply a high performance yet cost effective dual polarity high voltage supplies to the DSA driver.

2. Description of Related Art

There are various ways to supply dual polarity voltage to the DSA driver from the low voltage supplies. A simplified schematic of a generic prior art DSA driver 10 is shown for context in FIG. 1. An input voltage supplied from a DAC transitions from typical voltages of 0.6 volts to 2.6 volts and is supplied to the positive input of amplifier 12. A resistor feedback network is coupled between the output and the negative input of amplifier 12. Amplifier 12 is supplied by high voltage power supplies. The positive power supply is +20 volts and the negative power supply is −20 volts. The output of amplifier 12 then swings from −20 volts to +20 volts, which is sufficient for powering the DSA Piezo actuator, as shown in FIG. 1.

A first prior art method and circuit 20 shown in FIG. 2 uses a negative charge pump configuration plus a conventional boost regulator to provide the +VE and −VE power supply voltages. Control circuit 22 drives transistor M1. Diode D1 is coupled across the current path of transistor M1. The drain of transistor M1 is coupled to node 26, which is in turn coupled to a +12 volt supply voltage through inductor L1. The positive power supply +VE is provided by diode D4, which is coupled to node 26 at one end, and by capacitor C3, which is coupled to the other end of D4. The negative power supply −VE is provided capacitors C1 and C2, and diodes D2 and D3. Capacitor C1 is coupled to node 26 and to the junction of diodes D2 and D3. Capacitor C2 is coupled to diode D2 at the −VE supply voltage node.

A second prior art method shown in FIG. 3 and FIG. 4 uses separate positive and negative regulators 30 and 40 to provide the −VE and +VE power supply voltages. The positive voltage is generated by an inductive boost regulator and the negative voltage is generated by a negative capacitor charge pump. Accordingly, FIG. 4 shows a control circuit 42 for driving transistor M4 and diode D41, which are coupled to node 44. Inductor L41 is coupled between node 44 and the +12 volt supply voltage. Diode D42 is coupled between node 44 and node 46, which is the +VE supply voltage terminal. In turn, FIG. 3 shows a control circuit 32 for driving transistor M31 and diode D31, and transistor M32 and diode D32. The transistors are coupled between the V40 power supply and ground. Capacitor 31 is coupled between node 36, and diodes D33 and D34. Diode D34, in turn, is coupled to capacitor C32 at node 34, which is the −VE power supply voltage.

A third prior art method and circuit 50 shown in FIG. 5 uses a single inductor, dual polarity architecture that is used in a number of commercial devices. The regulator senses the output voltages via an operational transconductance amplifier ("OTA") and its feedback to a MUX for comparison with a low external low FET current limit. The high side turns on with a fixed pulse. A control circuit 59 is used to drive transistor M51 and diode D51, which are coupled to node 56. Transistor M52 and diode D52 are driven at node 54 and are powered by a +12 volt supply voltage. Inductor 51 is coupled between transistor M51 and transistor M52. Diode D53 is coupled to capacitor C51 at node 58 for providing the +VE power supply voltage. Diode D54 is coupled to capacitor C52 at node 52 for providing the −VE power supply voltage.

The circuit 60 shown in FIG. 6 is a more detailed version of the circuit shown in FIG. 5. Circuit 60 includes two OTAs 61 and 62 coupled to capacitors 64 and 65 and to MUX 66. The output of MUX 66 is coupled to comparator 68. The output of comparator 68 and a switching signal 67 are provided to control circuit 69 for driving transistor M61 and diode D61, and transistor M62 and diode D62. Inductor L61 is coupled between nodes 601 and 602. Diode D64 is coupled between node 602 and the HVP node for providing the +VE power supply voltage. Diode D63 is coupled between node 601 and the HVM node for providing the −VE power supply voltage. Feedback is provided from the HVM node to amplifier 62 and resistors R61 and R62. Feedback is provided from the HVP node to resistors R63 and R64. Feedback is provided from R65 to the negative input of comparator 68.

In a conventional disk drive, the Voice Coil Motor ("VCM") performs all positioning of the head to read data located on the disk. However, with current disk space demand, the track density on the disk media has grown tremendously. Since this a mechanical design, the assembly of the voice coil actuator tends to have low natural frequencies and these accumulate vibrations and cause Off-Track Errors. Therefore, one actuator is not enough to increase the data storage capacity. With the use of a secondary actuator at the tip of the main actuator, this complements the traditional VCM actuator and forms a dual stage servo system. With many current designs, this secondary actuator can be designed to have a higher natural frequency and also less vibration. With these mechanical designs, the whole system will need to be complemented with an electrical device or drivers to drive the secondary actuator. There is, therefore, a need to generate the bias voltage for the DSA driver of about ±20 volts from low voltage PC supplies of +5 volts and +12 volts.

SUMMARY OF THE INVENTION

According to the present invention, a dual supply circuit uses a dual feedback control, single inductor, dual polarity boost architecture with a low side power FET for end-of-current recirculation sensing. A dual feedback system tracks the output voltage variations and a low side power FET end-of-current recirculation sensing utilizes the internal current limit sensing system. Logic defining the state of operations allows the regulator to operate in both single and dual mode to cater to wide application ranges.

BRIEF DESCRIPTION OF THE DRAWINGS

The invention will be better understood by reference to the following description taken in conjunction with the accompanying drawings.

DETAILED DESCRIPTION

Figure 1:
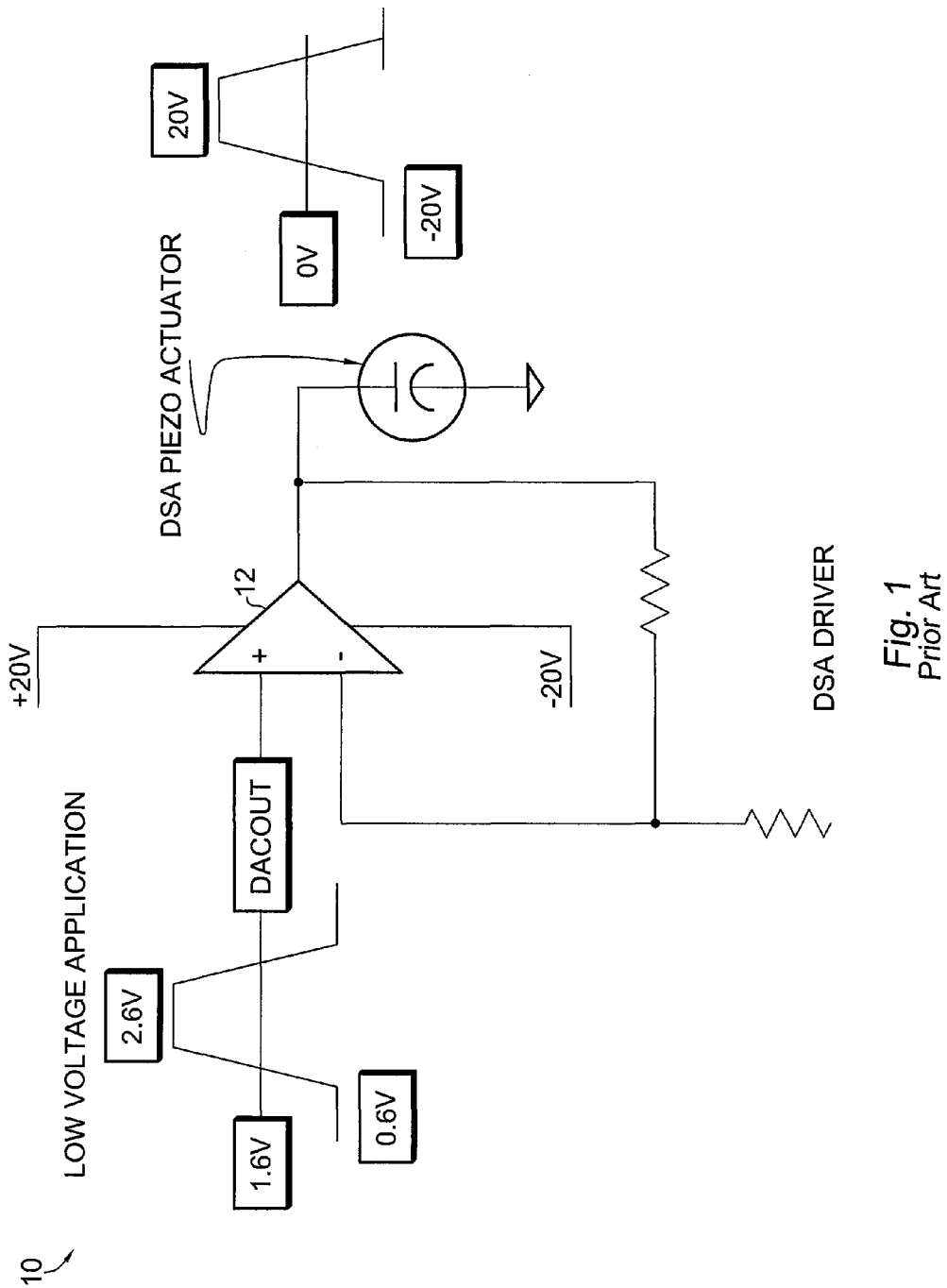
FIG. 1 shows a generic prior art dual supply circuit.
Figure 2:
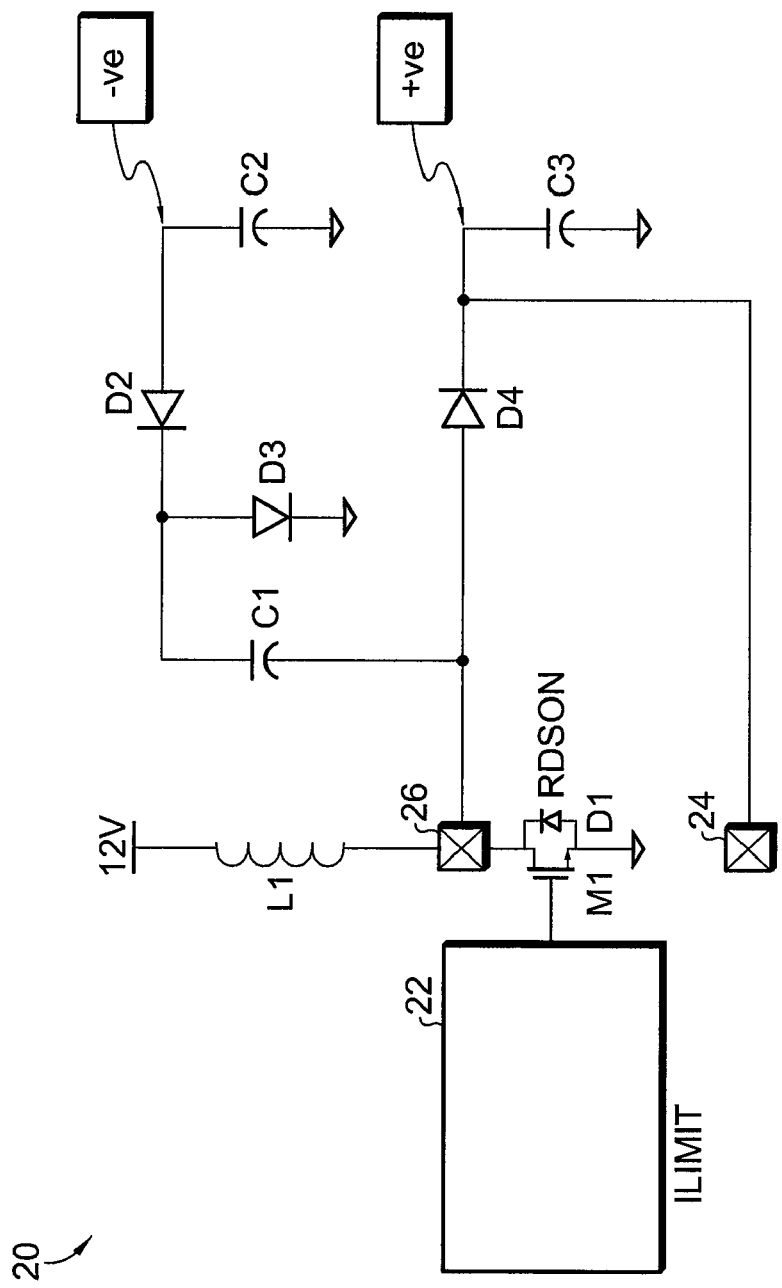
FIG. 2 shows a first prior art circuit for generating dual high voltage supplies from a low voltage power supply.
Figure 3:
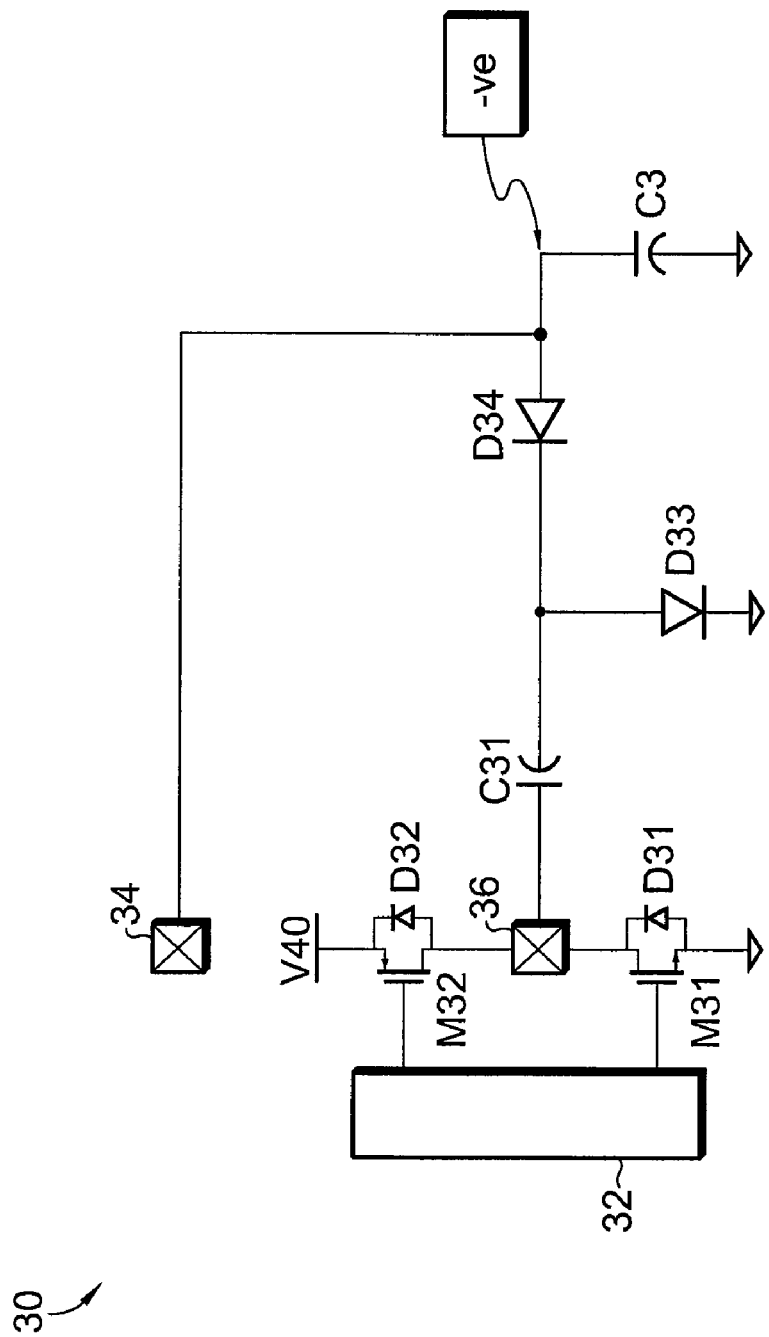
FIG. 3 and FIG. 4 together show a second prior art circuit for generating dual high voltage supplies from a low voltage power supply.
Figure 4:
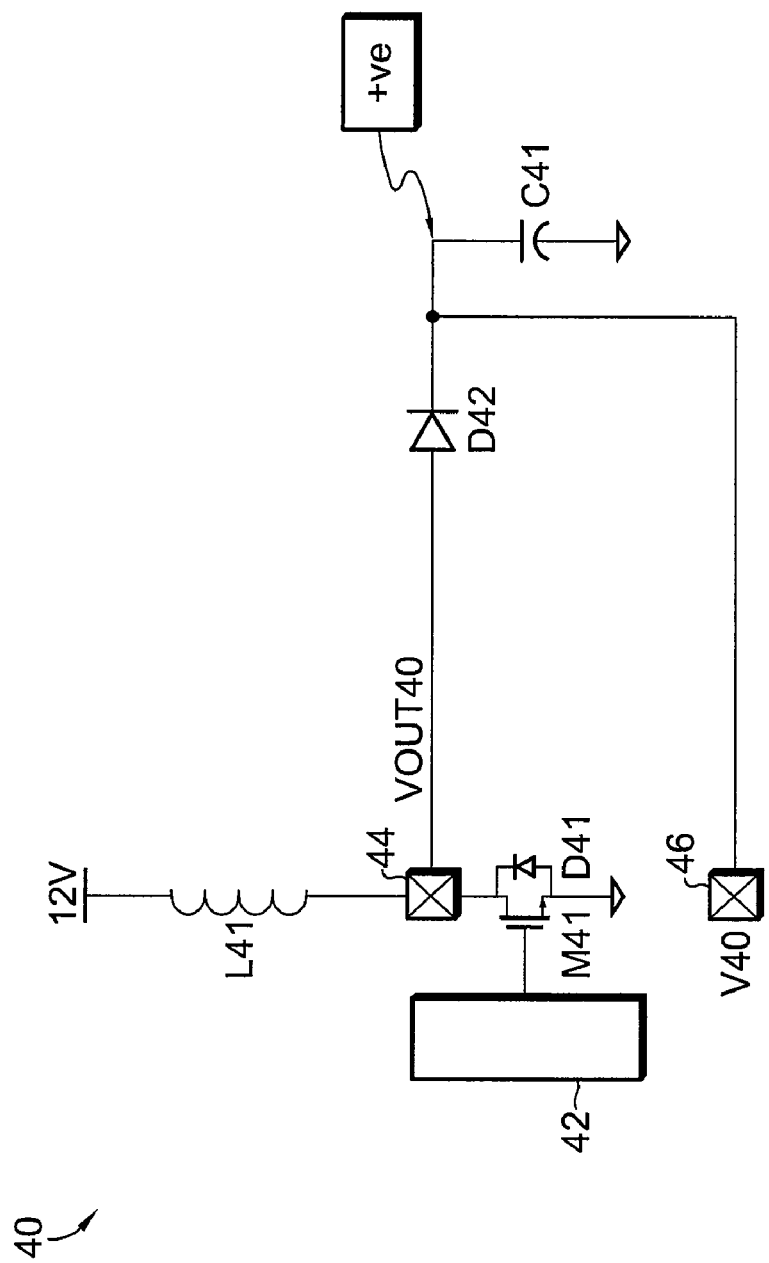
Figure 5:
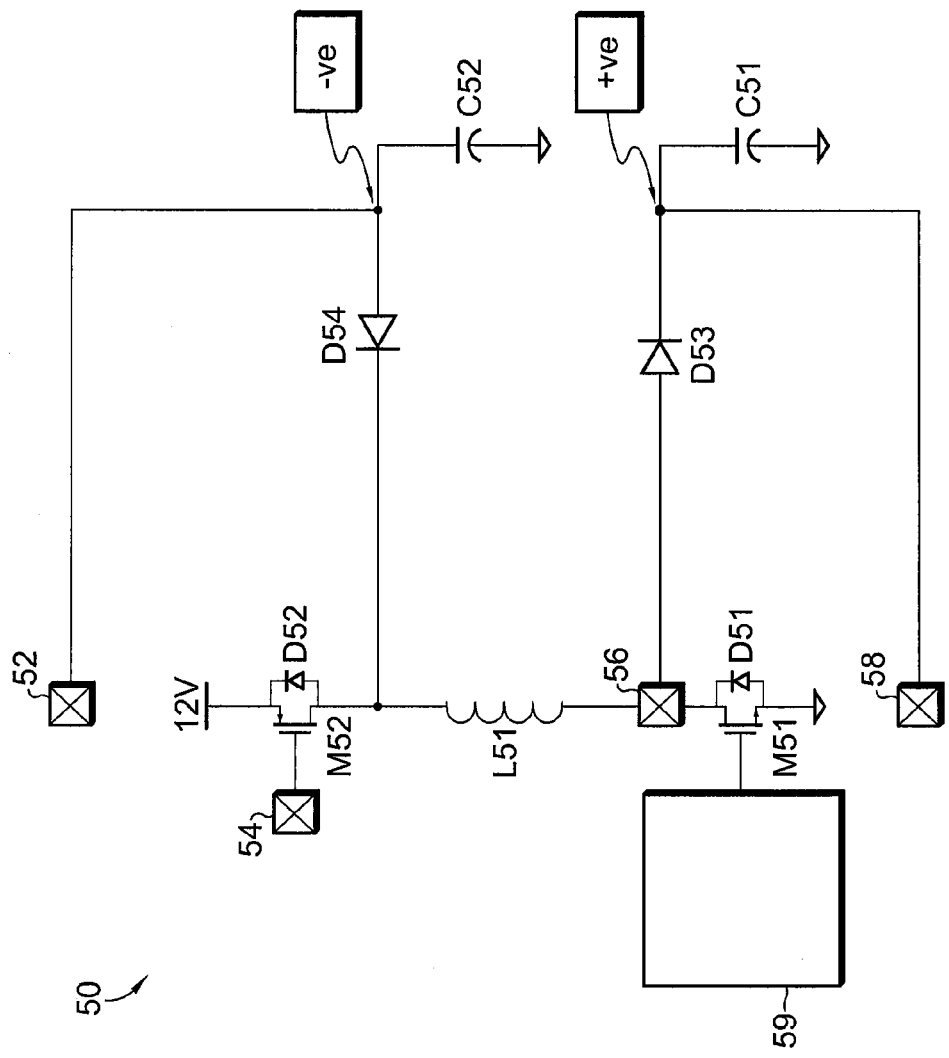
FIG. 5 shows a third prior art circuit for generating dual high voltage supplies from a low voltage power supply.
Figure 6:
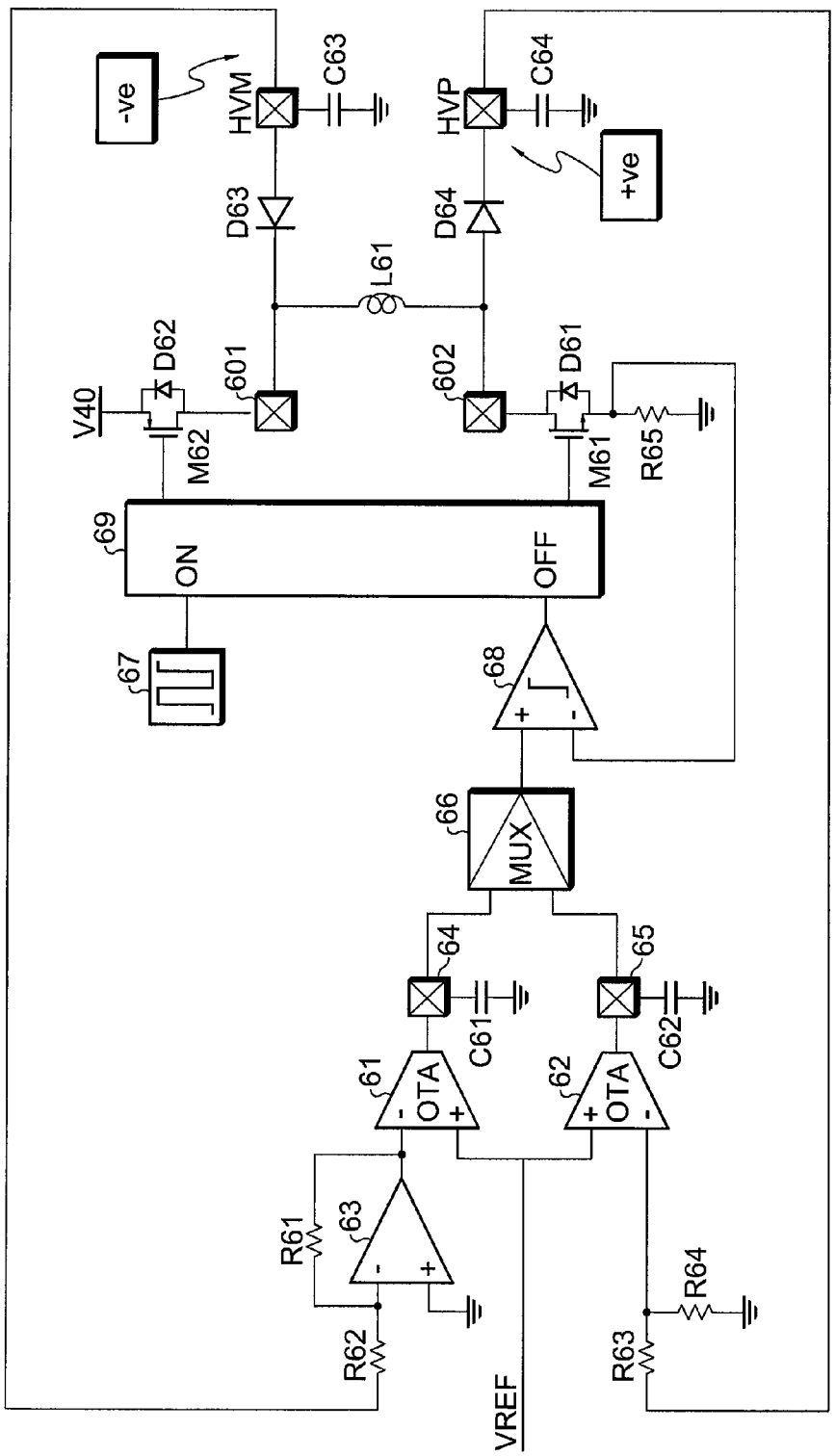
FIG. 6 is a more detailed circuit schematic of the circuit shown in FIG. 5.
Figure 7:
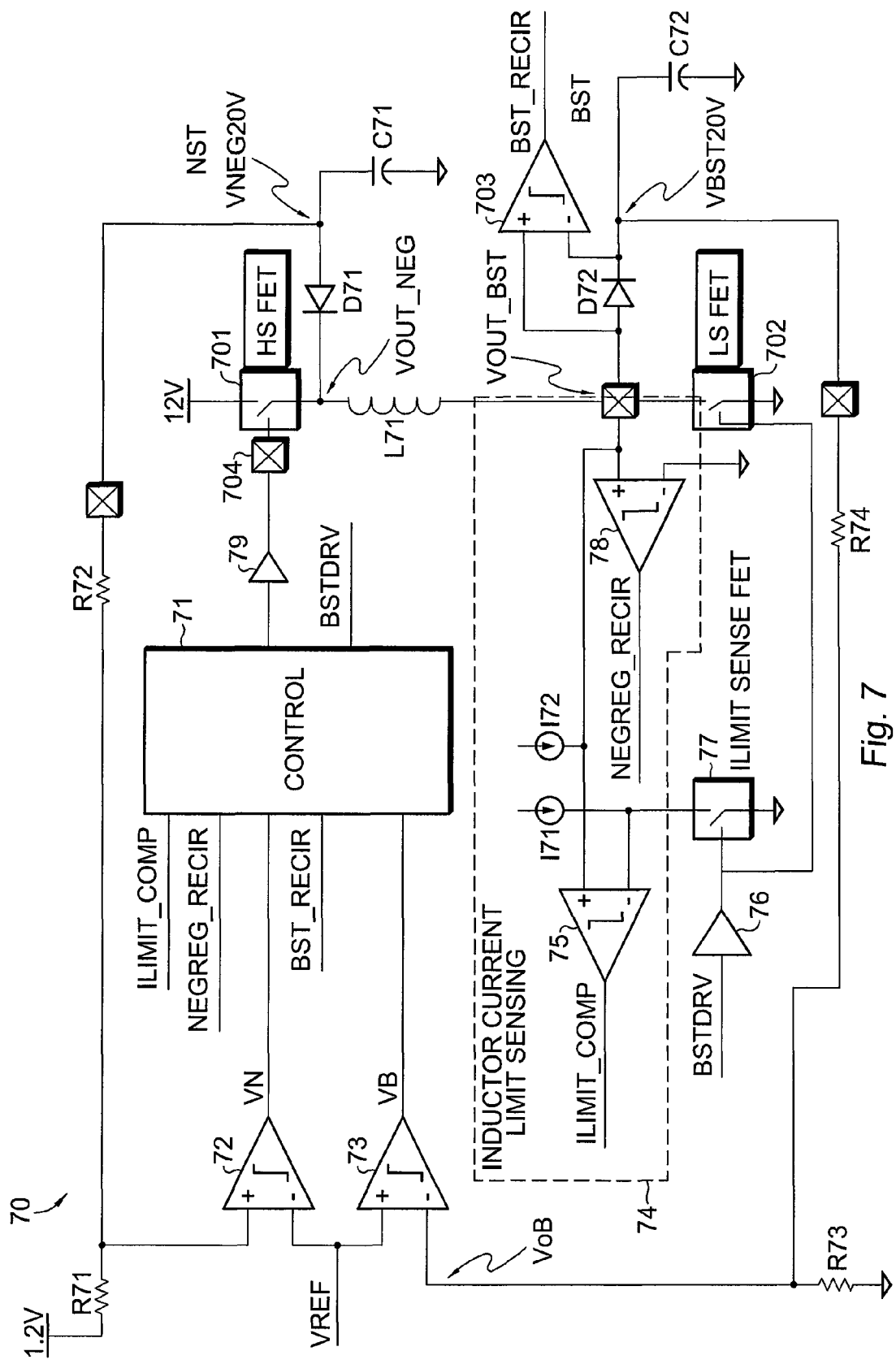
FIG. 7 is a schematic diagram of a dual power supply circuit according to an embodiment of the present invention.

A circuit 70 for controlling a single inductor using a dual polarity boost regulator according to an embodiment of the present invention is shown in FIG. 7. The circuit 70 uses two voltage comparators 72 and 73 to provide a dual feedback (VN and VB) to the regulator with common references (VREF). This tracks the output voltage in all load conditions. There are two end of recirculation comparators, the BST_Recir comparator 703 and the NegReg_Recir comparator 78 to sense both inductor current decays through inductor L71 during both positive and negative cycles of the regulator. Inductor L71 is coupled between the VOUT_NEG and VOUT_BST nodes. Diode D71 is coupled to capacitor C71 to provide the VNEG20V power supply voltage. Diode D72 is coupled to capacitor C72 to provide the VBST20V positive power supply voltage. Feedback is provided from the VBST20V supply terminal through resistors R73 and R74 to the negative input of the comparator 73. Feedback is provided from the VBEG20V supply terminal through resistors R72 and R71 to the positive input of the comparator 72.

The low side inductor current limit sensing circuit 74 is a novel design, integrating an internal sense FET to mirror the maximum current of the inductor L71, and at the same time, providing an additional internal sense FET to mirror the current decay of the negative cycle of the regulator. (This is explained in further detail with respect to FIG. 13, and is simplified as Ilimit sense FET 77 in FIG. 7). This mirroring of the current decay during the negative cycle of the regulator provides an end-of-recirculation signal to the main control logic, which will allow the operation states to function properly. The current limit sensing circuit also includes current sources I71 coupled to the negative input of comparator 75 and FET 77, and I72 coupled to the positive inputs of comparators 75 and 78.

The turning off and on of the HS FET 701 and LS FET 702 are controlled by the signals from VN, VB, Ilimit_comp, NegReg_Recir and BST_Recir provided to control circuit 71. These signals are synchronizing each other and turn off or turn on independently or together depending on what are load conditions or output voltage conditions. A detailed explanation of the operating state is provided below. The control circuit drives the HS FET 702 through buffer amplifier 79, and provides the BSTDRV signal to buffer amplifier 76, in turn driving the Ilimit Sense FET 77. The control block 71 referenced in FIG. 7 includes discrete logic that defines which mode and which states the regulator should operate in depending upon the input from the user and the control signals generated from the comparator circuits.

The BST_Recir comparator 703 is used to detect when the inductor energy is fully depleted. The BST_Recir comparator 703 detects the voltage difference between VBST20V and VOUT_BST. When BVST20V is greater than VOUT_BST, this means that the inductor energy is fully depleted. Comparator 78 is triggered when the inductor current flows through the low-side FET reaches zero amps.

Figure 19A:
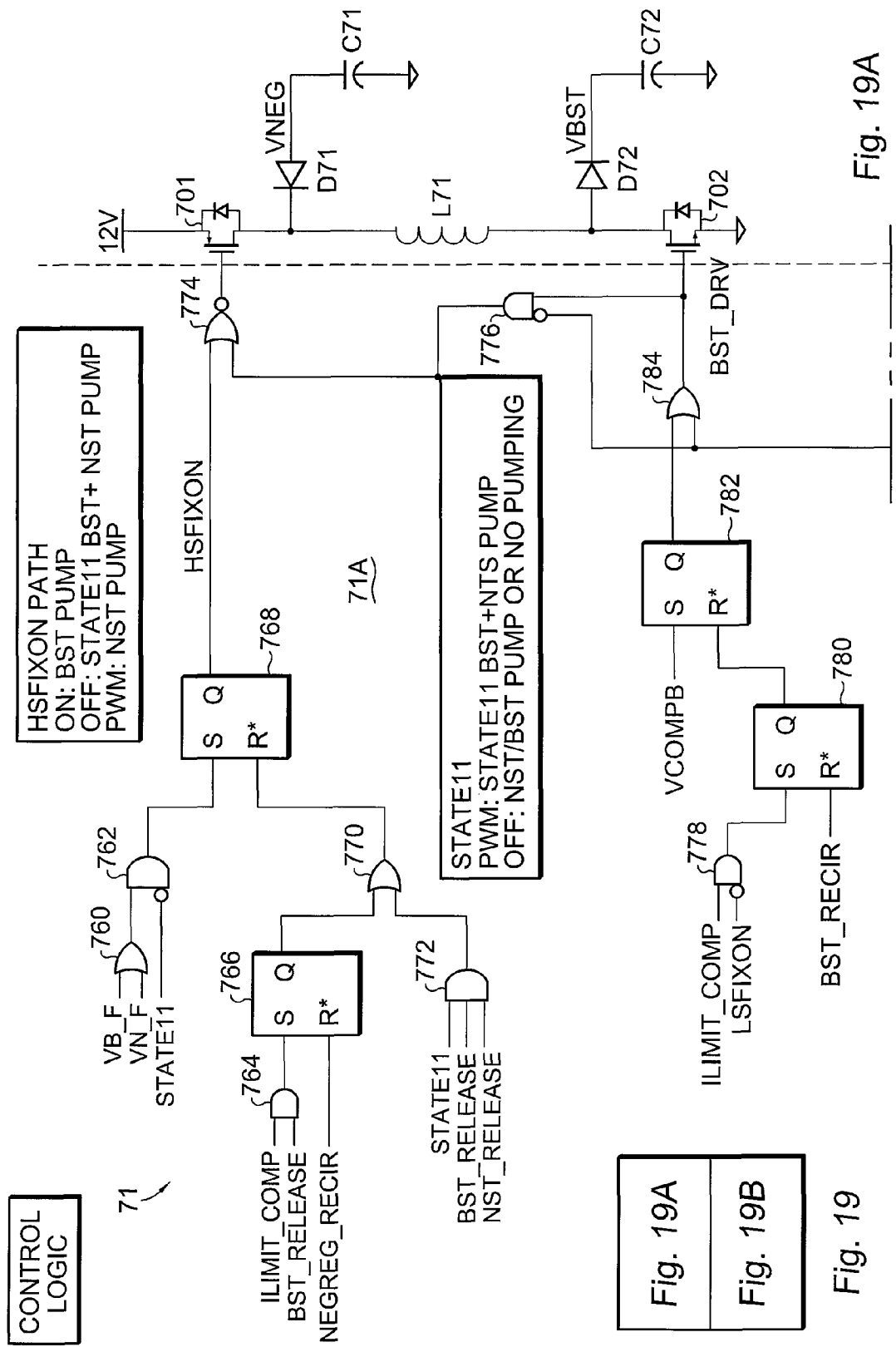
FIG. 19 is a schematic diagram of the control logic block shown in FIG. 7.
Figure 19B:
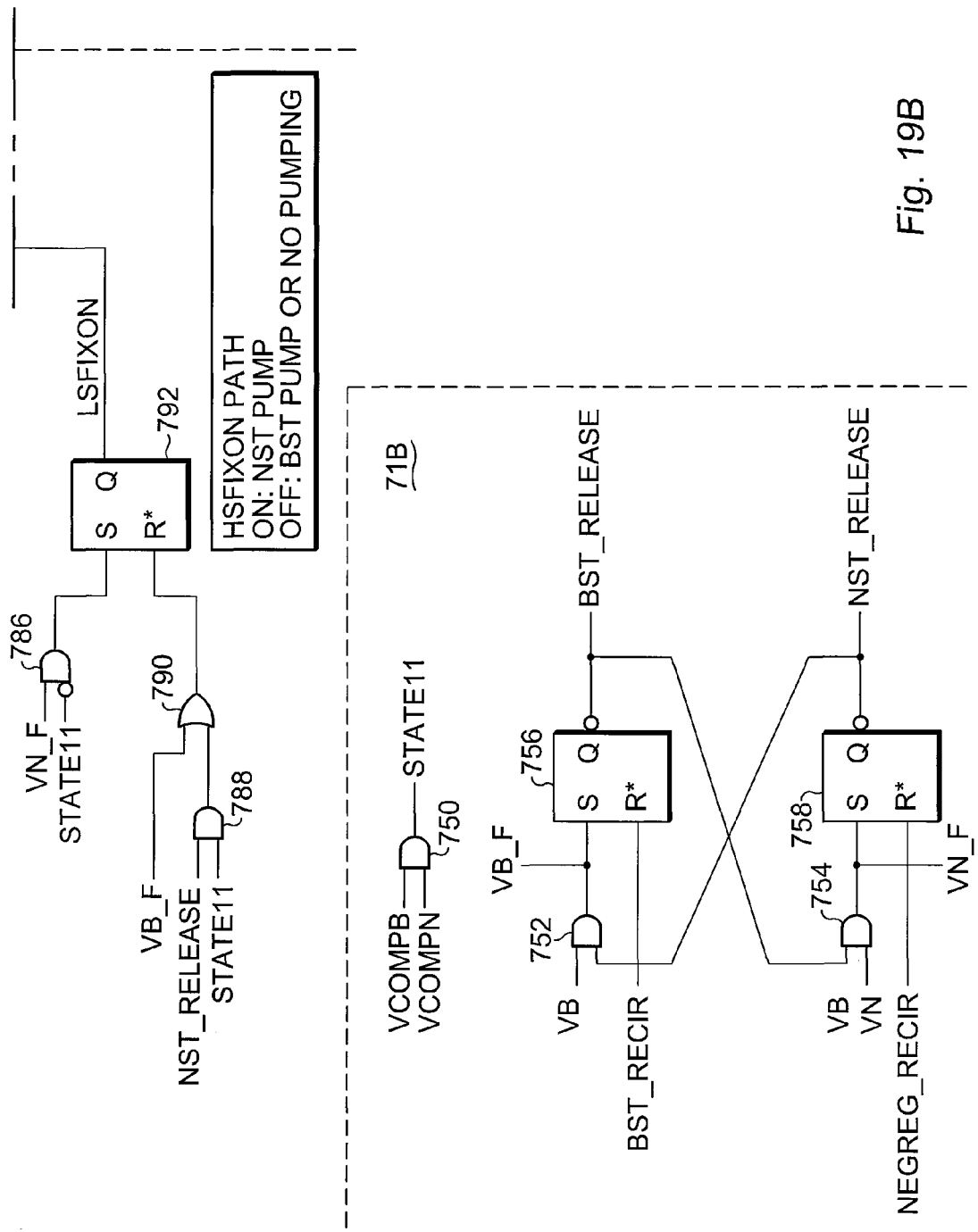

Turning momentarily to FIG. 19, a schematic diagram of the logic block 71 is shown that provides the details of the gate level logic used therein. Note that the same high-side FET 701, inductor L71, low-side FET 702, diodes D71 and D72, and capacitors C71 and C72 are used as in FIG. 7, for context. Logic block 71 includes a first logic section 71A that includes an OR gate 760 for receiving the VB_F and VN_F signals. An AND gate 762 is coupled to the output of OR gate 760 and receives the inverted state11 signal. AND gate 764 receives the Ilimit_comp and bst_release signals. The S input of flip-flop 766 is coupled to the output of gate 764 and the R input receives the Negreg_recir signal. The S input of flip-flop 768 is coupled to the output of gate 762, the R input is coupled to the output gate 770. AND gate 772 receives the state11, bst_release, and nst_release input signals. An input of NOR gate 774 receives the HSFIXON signal from the Q output of flip-flop 768. The other input is coupled to the output of gate 776. The output of gate 774 drives the gate of the high-side FET 701. AND gate 776 receives the inverter LSFIXON signal and the BST_DRV signal used to drive the gate of low-side FET 702. AND gate 778 receives the Ilimit_comp and inverted LSFIXON signals. Flip-flop 780 has an S input coupled to the output of gate 778, and an R input for receiving the BST_recir signal. Flip-flop 782 has an S input for receiving the VCOMPB signal and an R input coupled to the Q output of flip-flop 780. NOR gate 784 has an input for receiving the LSFIXON signal and an input coupled to the Q output of flip-flop 782. The output of gate 784 provides the BST_DRV signal for driving low-side FET 702. AND gate 786 receives the VN_F and inverted state11 signals. AND gate 788 receives the nst_release and state11 signals. OR gate 790 has an input for receiving the VB_F signal, and an input coupled to the output of gate 788. The S input of flip-flop 792 is coupled to the output of gate 786, and the R input is coupled to the output of gate 788. The Q output of flip-flop 792 provides the LSFIXON signal.

In FIG. 19, a second logic section 71B is also shown. In section 71B, gate 750 receives the VCOMPB and VCOMPN signals, and provides the state11 signal. AND gate 752 receives the VB and nst_release signals, and provides the VB_F signal. The S input of flip-flop 756, and the R input receives the BST_recir signal. The inverted Q output provides the bst_release signal. AND gate 754 receives the VN and bst_release signals, and provides the VN_F signal. The S input of flip-flop 758 is coupled to the output of gate 754, and the R input receives the Negreg_recir signal. The inverted Q output provides the nst_release signal.

In operation, HSFIXON path is ON for BST pumping, OFF for BST+NST pumping, and provides PWM for NST pumping. The state11 path provides PWM for state11 BST+

NST pumping, and OFF for NST/BST pumping or for no pumping. The LSFIXON path is ON for NST pumping, and OFF for BST pumping or for no pumping.

Figure 8:
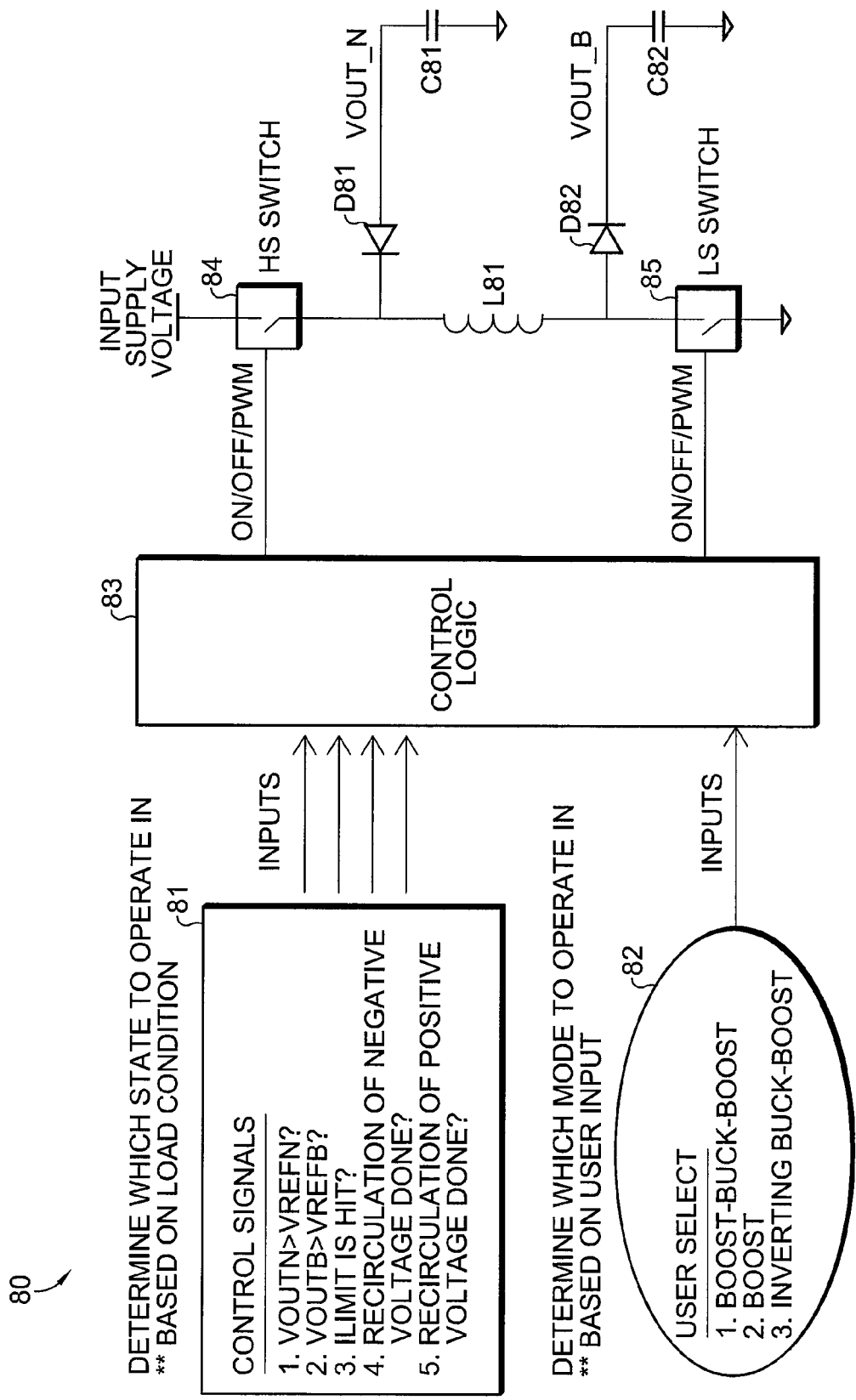
FIG. 8 is a simplified block diagram for a greater understanding of the detailed circuit diagram of FIG. 7.

Turning now to FIG. 8, a block diagram 80 is provided for a greater understanding of the operation of the detailed circuit 70 shown in FIG. 7. Control logic 83 receives inputs 81 based upon load conditions, as well as inputs 82 based upon user selected modes of operation. Inputs 81 are the following control signals, based upon load conditions:

1. Is VOUTN>VREFN?
2. Is VOUTB>VREFB?
3. Is the ILIMIT exceeded?
4. Is recirculation of the negative voltage finished?
5. Is recirculation of the positive voltage finished?

Inputs 82 are modes selected by the user:

1. Boost-Buck-Boost mode.
2. Boost mode.
3. Inverting Buck-Boost mode.

Control logic 83 provides the drive signals for operating the HS switch 84 and the LS switch 85, which are coupled together via an inductor L81. Diode D81 is coupled to capacitor C81 to provide the VOUT_N negative supply voltage. Diode D82 is coupled to capacitor C82 to provide the VOUT_B positive supply voltage.

Referring back now to FIG. 7, the BST, NST, and dual polarity modes of operation are explained.

The Negative Boost regulator ("NST") only operation is now explained. During a charging phase, HS FET 701 turns on and LS FET 702 turns on. Charging current (Icharging) flows through inductor L71 from the +12 volt supply to ground. When maximum current has been reached, circuit 70 enters into a discharging phase where HS FET 701 turns off and LS FET 702 turns on. This allows recirculation of current (Irecirculation) to flow from VNEG20V to ground because the inductor current has to decay. As a result, VNEG20V goes more negative and eventually, reaching the target negative output voltage. In the present invention, the target negative output voltage is −20 volts, but of course a different target voltage can be chosen for a given application.

Figure 9:
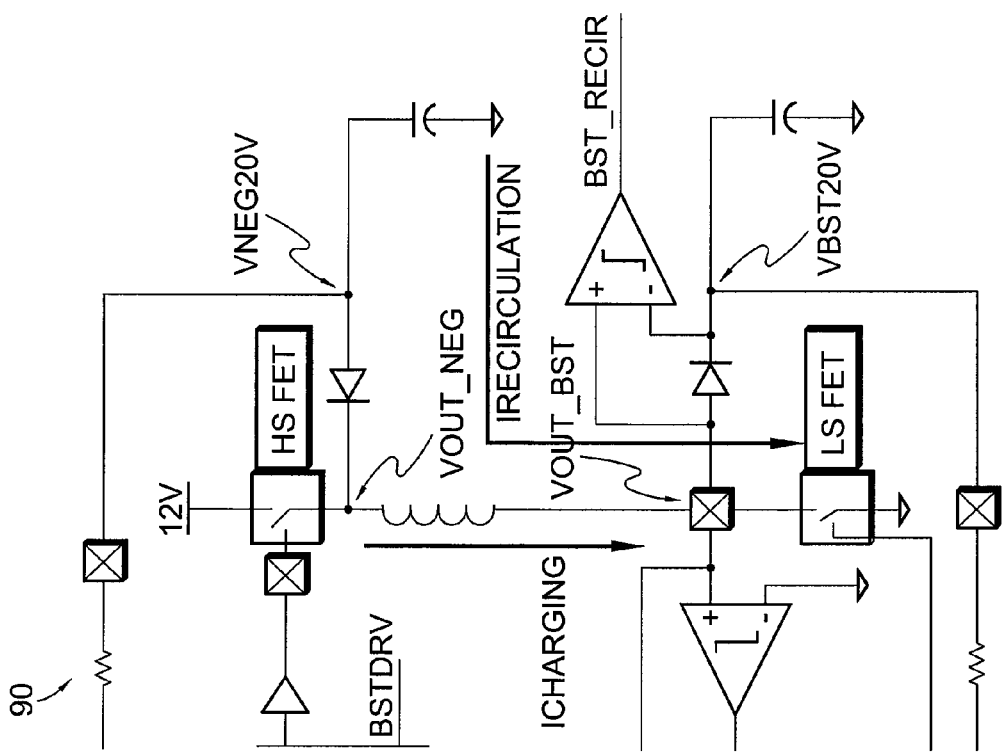
FIG. 9 is a partial schematic for understanding the negative boost regulator operation according to the present invention.

In the partial schematic 90 of FIG. 9, the Icharging and Irecirculation currents are shown for the NST mode of operation.

The Boost regulator ("BST") only operation is now explained. During a charging phase, HS FET 701 turns on and LS FET 702 turns on. Charging current (Icharging) flows through inductor L71 from the +12 volt supply to ground. During a discharging phase, when maximum current has reached, HS FET 701 turns on and LS FET 702 turns off. This allows recirculation of current (Irecirculation) to flow from +12 volts to VBST20V because the inductor current has to decay. As such, VBST20V goes more positive and eventually, reaching the target positive output voltage of +20 volts.

Figure 10:
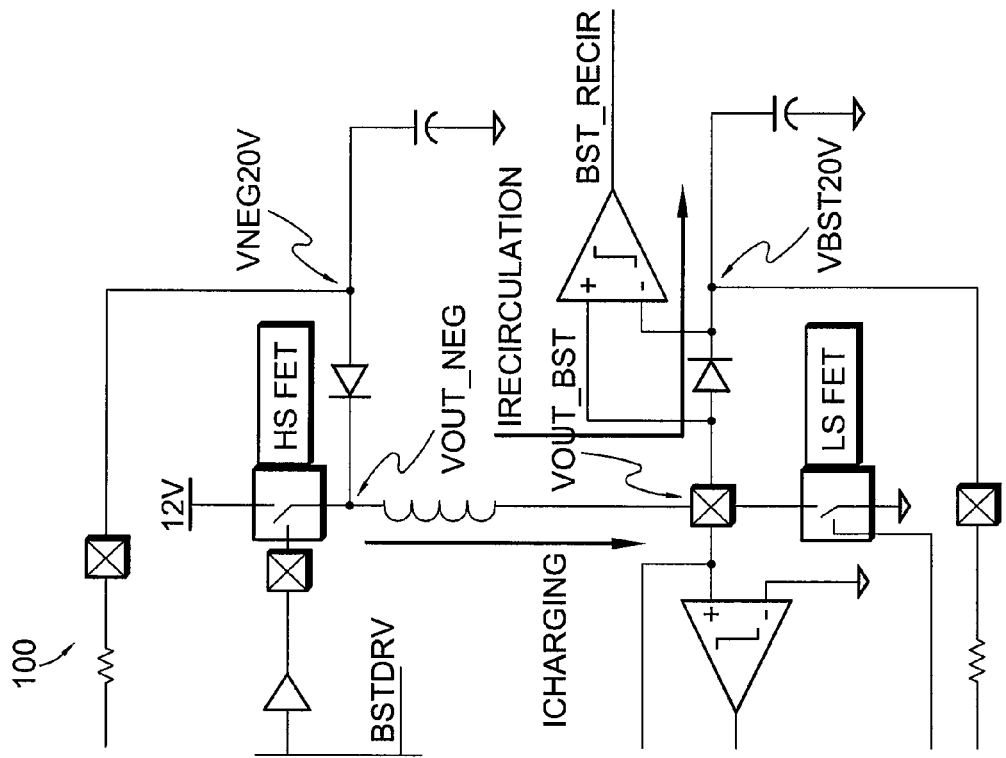
FIG. 10 is a partial schematic for understanding the boost regulator only operation according to the present invention.

In the partial schematic 100 of FIG. 10, the Icharging and Irecirculation currents are shown for the BST mode of operation.

The dual polarity boost regulator operation is now explained. During a charging phase, HS FET 701 turns off and LS FET 702 turns on. Charging current (Icharging) flows through inductor L71 from the +12 volt supply to ground. During a discharging phase, when maximum current has reached, HS FET 701 turn on and LS FET 702 turns off. This allows recirculation of current (Irecirculation) to flow from VNEG20V to VBST20V because the inductor current has to decay. As such, VBST20V goes more positive and eventually, reaching the target positive output voltage. Likewise, VNEG20V will go more negative and reaching target negative output voltage. Once recirculation of the inductor current has completed, both the HS FET 701 and LS FET 702 will turn off.

Figure 11:
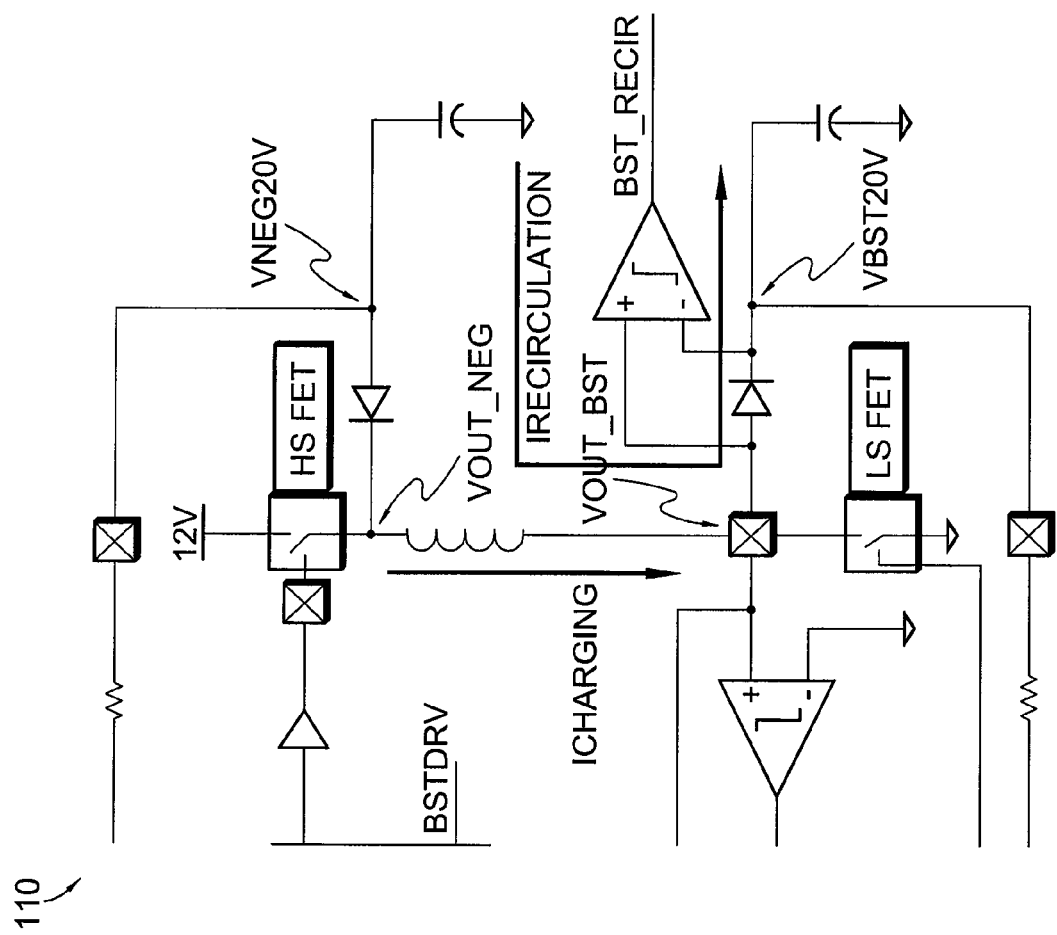
FIG. 11 is a partial schematic for understanding the dual polarity boost regulator operation according to the present invention.

In the partial schematic 110 of FIG. 11, the Icharging and Irecirculation currents are shown for the dual polarity boost regulator mode of operation.

Figure 12:
FIG. 12 is a set of tables for greater understanding of the logic states defining the operational modes of the circuit of the present invention.

Referring now to FIG. 12, the various logic states defining the operation of circuit 70 are explained with reference to Tables A, B, and C. In Table A, two rows are shown that represent the reference voltages for both positive and negative boost regulator outputs at +20V and −20V, respectively. The first column is the description of the output voltages. The next four columns are various feedback conditions. These four feedback conditions define the main four states (00, 01, 10, and 11) of operation. For example in column two, if the NST does not have enough voltage (>−20V) and BST has enough voltage (>+20V), this will decode the "STATE 10" in Table B. For column 3, if the NST does not have enough voltage (>−20V) and BST does not has enough voltage (<−20V), this will decode the "STATE 11". In Column 4, if NST has enough voltage (<−21V) and BST has enough voltage (>+21V), this will decode the "STATE 00" in. Lastly, in Column 5, if NST (<−21V) has enough voltage and BST (<20V) does not have enough voltage, this will decode the "STATE 01".

Referring now to Table B of FIG. 12, various states are shown defined by the output of both the voltage comparators of the tracking dual feedbacks. Column 1 defines the state name. Column 2 defines the comparator output name. Column 3 to column 6 defines the comparator output at each operational state.

In Tables A and B of FIG. 12:
VoN=negative output voltage,
VoB=positive output voltage,
RefN=reference for negative output voltage,
RefB (Ref)=reference for positive output voltage,
column1: Both negative and positive output voltages reach output target,
column2: Only negative output voltage reaches output target,
column3: Only positive output voltage reaches output target, and
column4: Both negative and positive output voltages are lower than output.

Referring now to Table C of FIG. 12, the operation conditions of the high side and low side FET during each state are tabled. Column 1 defines operation of the high side FET at each state, and vice versa. Column 2 defines operation of the low side FET at each state. For example, in "STATE 10", (NST does not have enough voltage and BST has enough voltage), the high side FET will be PWM and the low side FET will be forced to turn on. Likewise for "STATE 11" (both regulators do not have enough voltage) both high side FET and low side FET will be PWM. For "STATE 00", both regulators have enough voltage and both high side FET and low side FET will be off. No more pumping is required. Lastly for "STATE 01"—NST has enough voltage and BST does not have enough voltage, the high side FET will be turned on while the low side FET will be PWM.

In Table C of FIG. 12:
HF(STATE)=operating state of high side,
FET, LF(STATE)=operating state of low side FET, and operating state=ON/OFF/PWM (PWM=pulse width modulation).

The system is able to detect end-of-inductor current decay during "STATE 10" even with low side FET fully turned on. This is achieved by a novel maximum current detection circuit that can sense both maximum current limit and end of negative current decay. In addition, with respect to Tables A, B, and C, VoN is the feedback voltage on the comparator for NST, and VoB is the feedback voltage on the comparator for BST. The feedback voltage is compared with the reference voltage using a comparator and defines its operational state.

Figure 13:
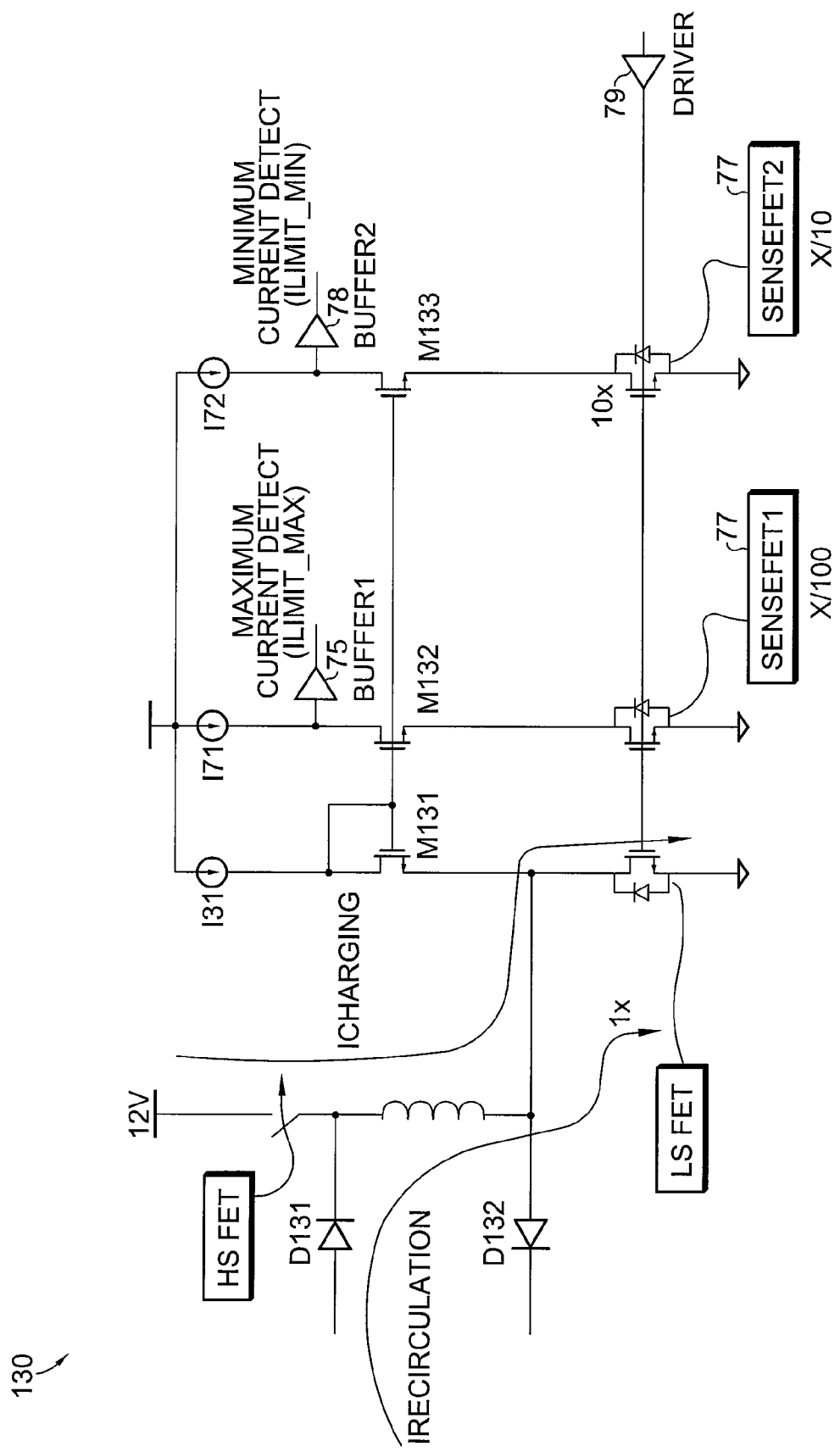
FIG. 13 is a schematic diagram of a circuit used for current limit detection and end of negative current recirculation detection according to the present invention.

Referring now to FIG. 13, current limit detection and end of negative current recirculation detection is explained in further detail. Circuit 130 is used for inductor current limit sensing. During an inductor current charging phase, current flows from the supply to the LS FET and this is mirrored with senseFET1. When the target current is developed across the inductor, the voltage across senseFET1 rises until buffer1 for senseFET1 trips and this is the maximum current limit. During the inductor current discharging phase, AND if "STATE 10", the current will be sensed through senseFET2. This will detect a minimum current limit when inductor current from NST decays to near zero. When this happens, the output voltage across senseFET2 will fall until buffer2 for senseFET2 trips and this is the minimum current limit or negative end of recirculation detection. Circuit 130 includes current source I31, as well as currents I71 and I72, referring back to FIG. 7. Transistor M131 is a diode-connected transistor receiving the I131 current. Transistor M132 receives current I71, and transistor M133 receives current I72. Buffer1 corresponds to comparator 75 in FIG. 7, and buffer2 corresponds to comparator 78 in FIG. 7. The size of senseFET1, which corresponds to transistor 77 in FIG. 7 is 1/100 that of the low-side FET. The size of senseFET2 is one-tenth that of the low-side FET. Driver 79 from FIG. 7 drives the gates of the low-side FET, as well as senseFET1, and senseFET2. The drains of the low-side FET, senseFET1, and senseFET2, are respectively coupled to the sources of M131, M132, and M133.

Figure 14:
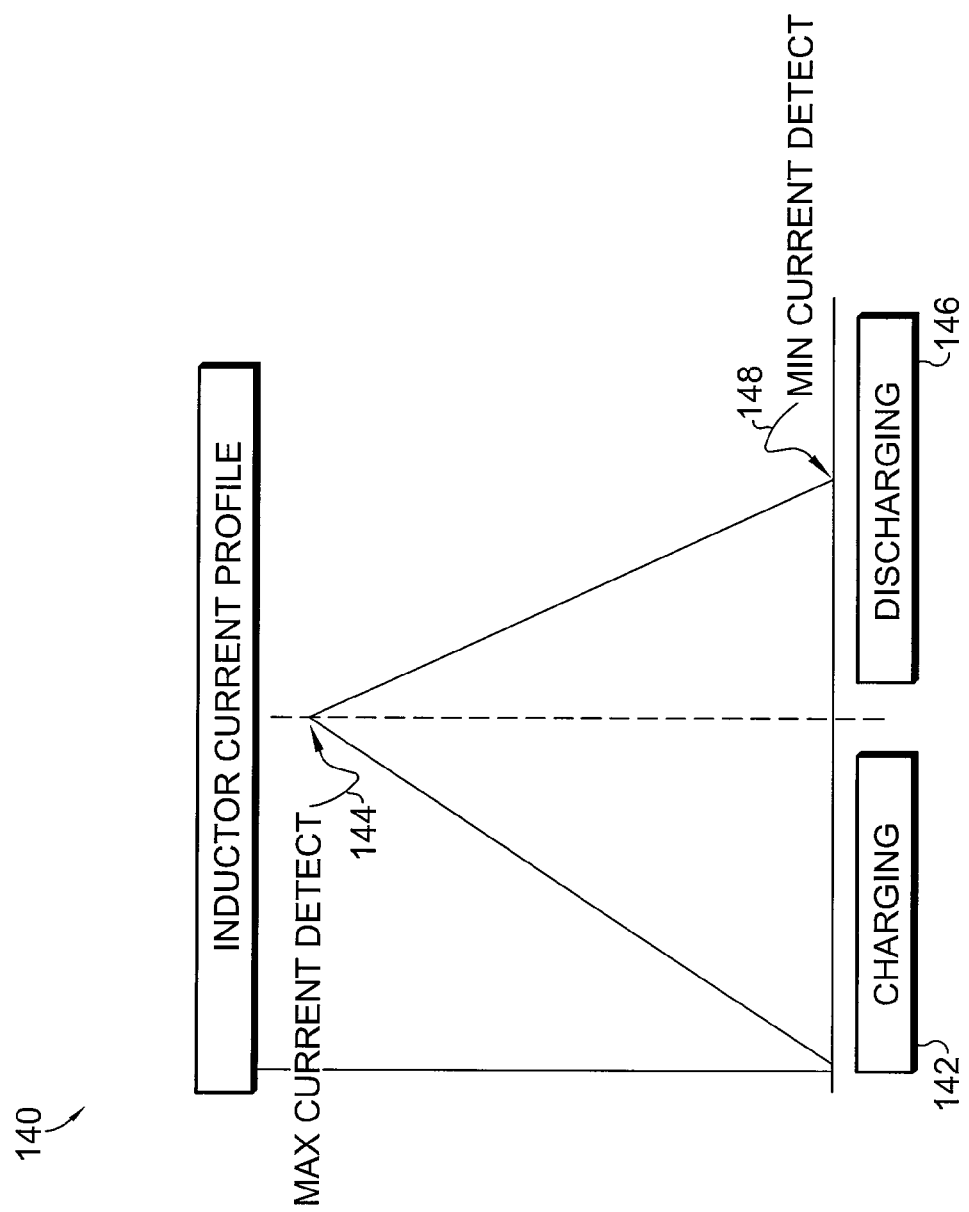
FIG. 14 is a plot of the inductor current profile according to the present invention.

The inductor current profile is shown in the chart 140 of FIG. 14. During the charging phase 142 the inductor current reaches a maximum current detect limit 144. During a discharging phase 146 the inductor current reaches a minimum current detect limit 148.

Referring to the timing diagrams of FIGS. 15-18, the following signals from circuit 70 in FIG. 7 are referenced:
 BST_current (current associated with node VBST20V);
 NEG_current (current associated with node VNEG20V);
 Inductor Current (current flowing through inductor L71);
 VN (voltage at the VN node);
 VB (voltage at the VB node);
 VOUT_BST (voltage at the VBST20V node); and
 VOUT_NEG (voltage at the VNEG20V node).
Various load conditions are now presented and explained with reference to the timing diagrams of FIGS. 15-18.

Figure 15:
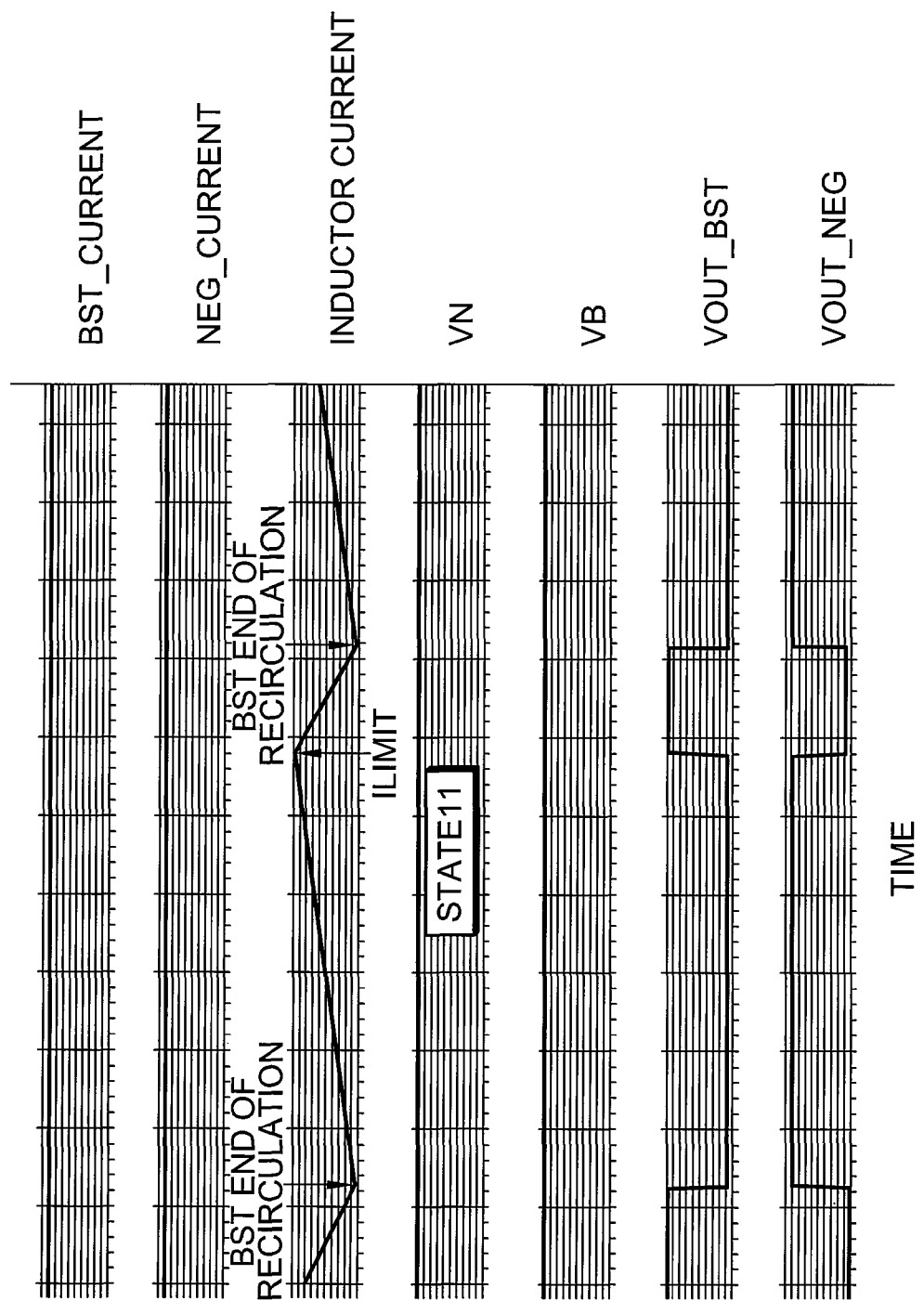
FIGS. 15-18 are timing diagrams showing a number of pertinent waveforms at various nodes for a greater understanding of the operational modes of the circuit of the present invention under high and low load conditions.

Referring now to FIG. 15, a BST High Load, NST High Load condition is presented. When both NST and BST are below regulation voltage, the regulator enters into STATE 11. This turns on both the high side FET and the low side FET. When both FETs are on, the inductor current starts to charge up until the current limit has been reached. When the current limit has been reached, the inductor current will decay from VNEG20V to VPOS20V. As such, the VNEG20V will be more negative and VPOS20V will be more positive. At the BST end of recirculation, the next charging cycle will begin. Operation will continue until the next state is triggered.

Figure 16:
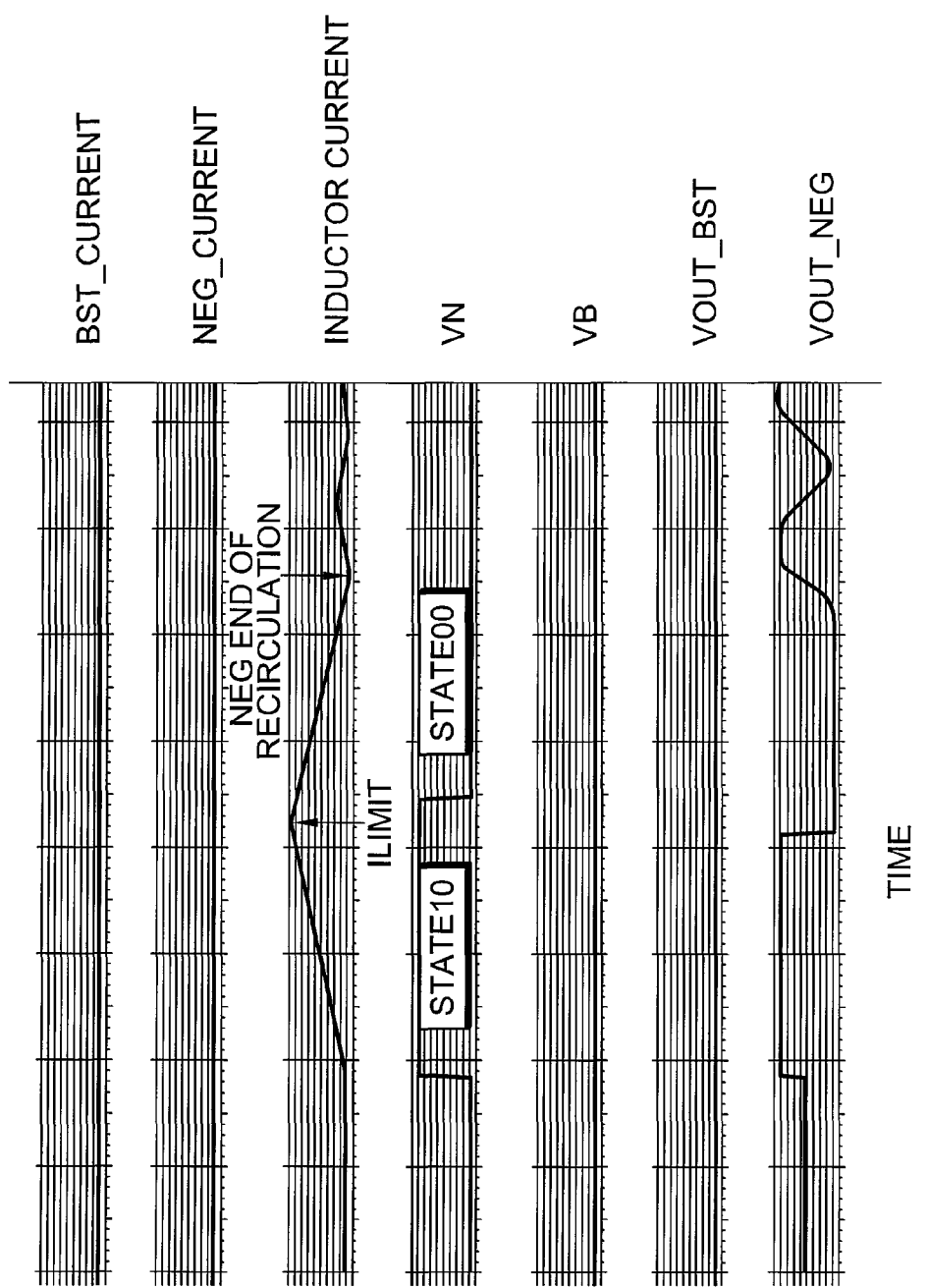

Referring now to FIG. 16, a BST Low Load, NST Low Load condition is presented. When both NST and BST have reached the regulation voltage, the regulator will be entering into "STATE00". This will turn off both high side FET and low side FET. The timing diagram of FIG. 16 shows a transition from "STATE10" to "STATE00". The regulator will pump occasionally to top up the output voltage. In this case the negative regulator output voltage is slightly not enough and the regulator will pump to top it up without charging the BST.

Figure 17:
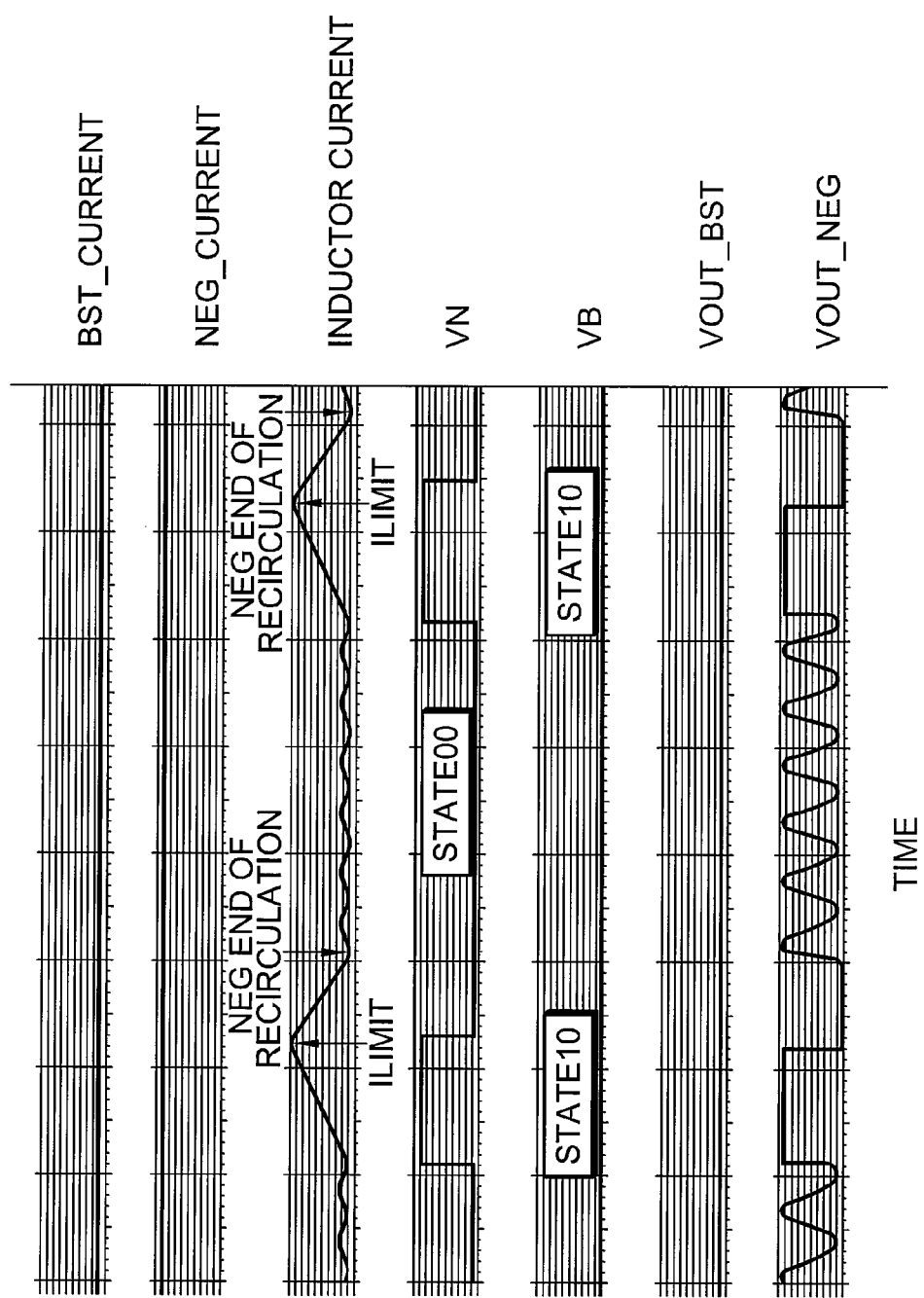

Referring now to FIG. 17, a BST Low Load, NST High Load condition is presented. When NST is below regulation voltage and BST has reached regulation voltage, the regulator will be entering into "STATE00" and "STATE10". This will turn on low side FET and doing a PWM on high side FET. The diagram of FIG. 17 shows a transition from "STATE10" to "STATE00". BST has enough voltage and NST does not have enough voltage. The regulator will change the state from "STATE00" to "STATE10". The high side FET will pump and the low side FET will be turn on. The inductor current will be charge up when high side FET until maximum current limit has reached. Then high side FET will turn off until negative end of recirculation has detected. The state will change to "STATE00" because all voltages are good. The cycle will repeat to maintain a constant output voltage.

Figure 18:
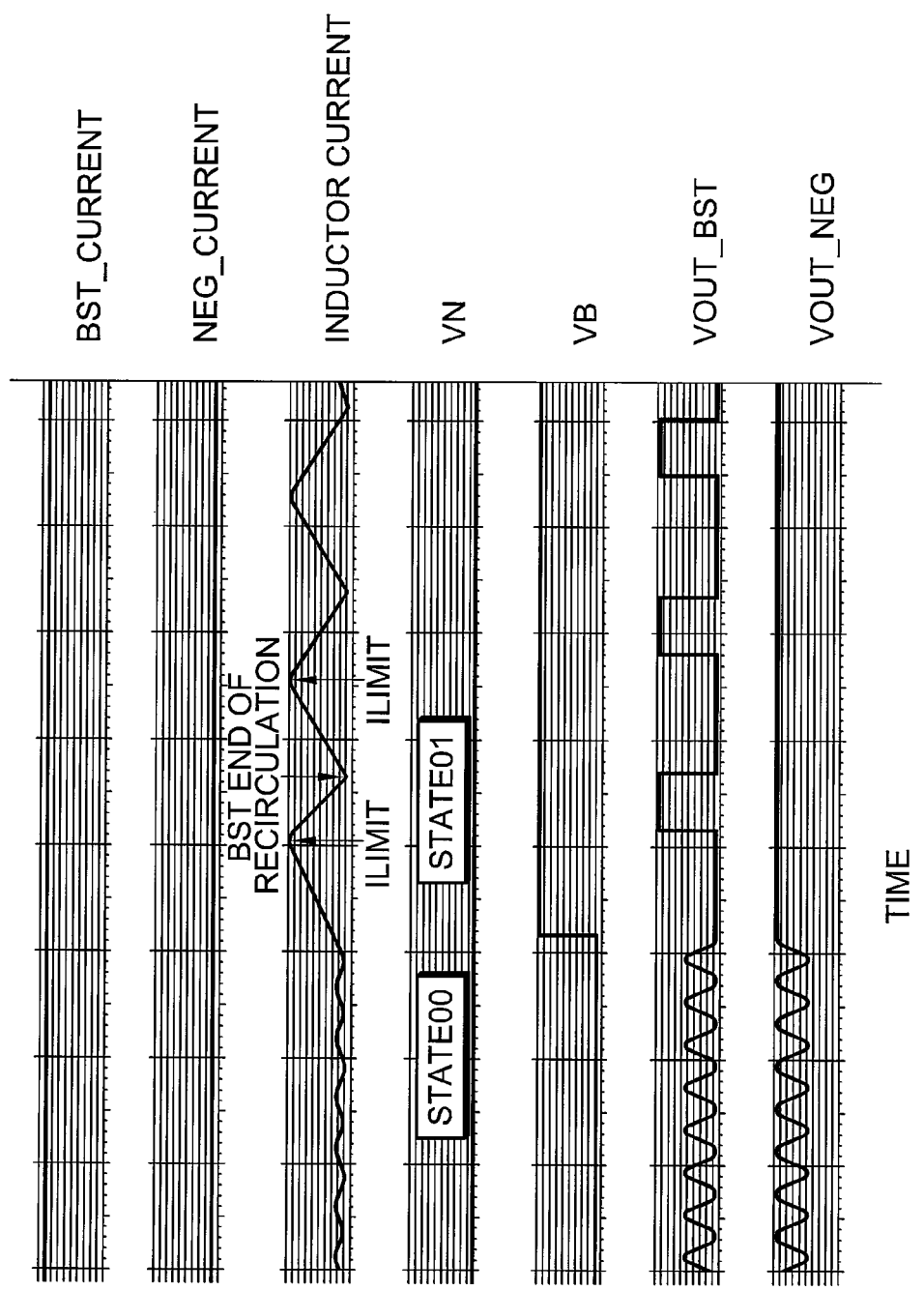

Referring now to FIG. 18, a BST High Load, NST Light Load condition is presented. When BST is below regulation voltage and NST has reached the regulation voltage, the regulator will be entering from "STATE00" and "STATE01". This will turn on the high side FET and doing a PWM on the low side FET. The diagram of FIG. 18 shows a transition from "STATE00" to "STATE01". BST does not have enough voltage and NST has enough voltage. The low side FET will pump and the high side FET will be turned on. The inductor current will be charged up until maximum current limit has been reached. Then the low side FET will turn off until BST end of recirculation has detected to start the next cycle.

The design of the present invention can operate in three modes: (1) Boost-Buck-Boost, (2) Boost, and (3) Inverting Buck-Boost. In addition, the design of the present invention has four states: (1) stop regulate—state00, (2) regulate only positive output voltage—state01, (3) regulate only negative output voltage—state10, and (4) regulate both negative and positive output voltage—state11. If the user chooses to operate the regulator in a "boost-buck-boost regulator mode", the regulator will enter and change between all of the four states above automatically by load condition. If the user chooses to operate the regulator in a "boost regulator mode", the regulator will enter and change between states (1) and (2) automatically by load condition. If the user chooses to operate the regulator in an "inverting buck-boost regulator mode", the regulator will enter and change between states (1) and (3) automatically by load condition.

The Boost-Buck-Boost regulator mode generates higher non-inverting and inverting output voltage. The Boost regulator mode generates higher non-inverting output voltage. The Inverting Buck-Boost regulator mode generates higher inverting output voltage. It is important to note that these modes are selected by the user while the four different operating states are defined by load conditions.

While there have been described above the principles of the present invention in conjunction with specific implementations of a dual power supply circuit in accordance with the present invention, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicant hereby reserves the right to formulate new claims to such features and/or combinations of such features during the prosecution of the present application or of any further application derived therefrom.

We claim:

1. A single inductor dual polarity boost regulator comprising:
   a high side switch having an input and a first current node for receiving an input supply voltage;
   an inductor having a first node coupled to a second node of the high side switch;
   a low side switch having an input, a first current node coupled to a second node of the inductor;
   a first diode circuit coupled to the first node of the inductor for providing a negative output supply voltage;
   a second diode circuit coupled to the second node of the inductor for providing a positive output supply voltage; and
   a control circuit that controls the high side switch and the low side switch, the control circuit including:
   dual feedback controls to track the negative and positive output voltage supply variations; and
   a current limit detection circuit, coupled to the low side switch, for detecting a maximum current limit and an end of current decay of the inductor.

2. The regulator of claim 1 wherein the dual feedback controls comprise two comparators sharing a single reference voltage.

3. The regulator of claim 1 wherein the control circuit controls the high side switch and the low side switch to allow a recirculation current to flow through the inductor when the maximum current limit is detected.

4. The regulator of claim 3 wherein the control circuit further receives a user input for configuring the regulator to be in one of a boost-buck-boost, boost, and inverting buck-boost mode.

5. The regulator of claim 3 wherein one of the positive and negative output supply voltages can be controlled independently of the other when the regulator is in one of the boost mode and inverting buck-boost mode.

6. The regulator of claim 1 wherein the operation state of the regulator is defined by a logic circuit coupled to a negative output comparator and a positive output comparator.

7. The regulator of claim 1 wherein the control circuit is configured to provide a boost-buck-boost operational mode.

8. The regulator of claim 1 wherein the control circuit is configured to provide a boost operational mode.

9. The regulator of claim 1 wherein the control circuit is configured to provide an inverting buck-boost operational mode.

10. The regulator of claim 1 wherein the control circuit receives a plurality of control signals based on load conditions.

11. The regulator of claim 1 wherein the control circuit receives a plurality of control signal based on user input.

12. The regulator of claim 1 wherein the first and second diode circuits each comprises a capacitor.

13. A regulator circuit for driving a high side FET and a low side FET in a single inductor, dual power supply system, comprising:
    a control circuit for providing on, off, and PWM signals to an input of the high side FET and to an input of the low side FET;
    a first feedback path from a first output voltage to the control circuit;
    a second feedback path from a second output voltage to the control circuit; and
    a plurality of user control inputs to the control circuit; and
    a current limit detection circuit, coupled to the low side FET, for detecting a maximum current limit and an end of current decay of the inductor.

14. The regulator circuit of claim 13 wherein the first feedback path comprises a comparator.

15. The regulator circuit of claim 13 wherein the second feedback path comprises a comparator.

16. The regulator circuit of claim 13 further comprising first and circuit recirculation current comparators.

17. A regulator circuit for driving a high side FET and a low side FET in a single inductor, dual power supply system, comprising:
    a control circuit for providing on, off, and PWM signals to an input of the high side FET and to an input of the low side FET;
    a first feedback path from a first output voltage to the control circuit;
    a second feedback path from a second output voltage to the control circuit; and
    a current limit circuit coupled to the low side FET for detecting a maximum current limit and an end of current decay of the inductor.

18. The regulator circuit of claim 17 wherein the current limit circuit comprises:
    a first sense FET having a gate coupled to a gate of the low side FET; and
    a second sense FET having a gate coupled to the gate of the low side FET.

19. The regulator circuit of claim 17 further comprising a first FET coupled to a drain of the low side FET, a second FET coupled to a drain of the first sense FET, and a third FET coupled to a drain of the second sense FET.

20. The regulator circuit of claim 19 further comprising first, second, and third current sources coupled to the first, second, and third FETs.

* * * * *